United States Patent [19]

Nussbaumer

[11] 3,914,588

[45] Oct. 21, 1975

[54] DIGITAL FILTERS

[75] Inventor: Henri J. Nussbaumer, La Gaude, France

[73] Assignee: International Business Machines Corporation, Armonk, N.Y.

[22] Filed: Dec. 3, 1974

[21] Appl. No.: 529,205

[30] Foreign Application Priority Data

Dec. 11, 1973 France .............................. 7345377

[52] U.S. Cl. ................ 235/156; 328/167; 333/70 T

[51] Int. Cl.[2] ............................................ G06F 7/38

[58] Field of Search ........... 235/156, 152; 333/70 T, 333/18, 28 R; 328/167

[56] References Cited

UNITED STATES PATENTS 3,737,636 6/1973 Esteban ............................. 235/152

3,777,130 12/1973 Croisier et al. ...................... 235/152

3,822,404 7/1974 Croisier et al. ................. 235/156 X

*Primary Examiner*—Joseph F. Ruggiero

*Attorney, Agent, or Firm*—Delbert C. Thomas

[57] ABSTRACT

A transversal type of digital filter is disclosed which uses substantially less hardware than previously known types. Conventional multiplying devices are eliminated by use of a read only memory containing a table of squares and addressed both by weighted value samples of the input signal and by values of the input signal. The weighted values are accumulated and corrected by the use of the second squared values addressed by the value of the signal sample to generate a sample of a filtered output signal.

3 Claims, 5 Drawing Figures

DIGITAL FILTERS

OBJECTS OF THE INVENTION

This invention relates to digital filters.

A digital filter is a device used to determine the values of the successive samples $Y_i$ of a filtered output signal Y by forming the sums of algebraic products of the successive values of samples of an input signal X. More specifically, if $x_{i-k}$ is the sample at instant $(i-k)$ of an input signal $x$ to be filtered, the sample $Y_i$ of the filtered signal at instant $i$ can be derived from the expression $$Y_i = \sum_{k-1}^{n} a_k \cdot x_{i-k} \qquad (1)$$

where the $a_k$ are constant coefficients which are a function of the characteristics of the desired filter. A filter capable of performing operation (1) is called a transversal filter with n coefficients. However, sample $Y_i$ can also be obtained from an expression which uses the previously computed samples $Y_{i-k}$. This can be done by means of a so-called recursive filter which provides samples $Y_i$ that satisfy an expression of the type $$Y_i = \sum_{k=1}^{n/2} a_k\, x_{i-k} + \sum_{k=1}^{n/2} b_k \cdot Y_{i-k} \qquad (2)$$

for a number $n$ of coefficients which is the same as for the transversal filter mentioned above.

It will be observed that, whether the filter is of the transversal or of the recursive type, the samples $Y_i$ of the filtered signal can be expressed as $$Y_i = \sum_{1}^{n} \alpha_k \cdot z_{i-k} \qquad (3)$$

where the $\alpha$ represent coefficients $a$ and $b$, and the $z_{i-k}$ represent data samples $Y_{i-k}$ and/or $x_{i-k}$.

Thus, in the general case, $n$ multiplication operations, hence $n$ multiplier devices, are required to obtain $Y_i$. Since multipliers are expensive devices, it is highly desirable to reduce their number to a minimum. In the past, various filter structures have been proposed which allow the number of multipliers required to be reduced by up to approximately 50%. Such a reduction constitutes a significant improvement and would be entirely satisfactory in many applications. However, in those applications which require the use of a considerable number of filters, said structures are still quite expensive.

Other filter structures have been proposed, which can be made to accomplish various functions using multiplexing techniques. The main component of these prior art filters is a memory storing the partial results of the operations summarized by expression (3) above. The values of the samples of signals $x_{i-k}$ and $y_{i-k}$ are stored in digital shift registers and serve as storage addresses to control data fetches from a memory, the result $y_i$ being obtained by means of simple logical operations wherein the data fetched from the memory are accumulated and shifted. Such a filter is described, for example, in French Pat. No. 70 47123 filed by the same assignee on December 17, 1970 and corresponding to U.S. Pat. No. 3,777,130 issued on Dec. 4, 1973. and corresponding to applicant's U.S. Pat. application Ser. No. 513,797 filed on Oct. 10, 1974. However, the cost of these filters in the larger embodiments may well become prohibitive due to the fact that the memory size required is an exponential function of the number of coefficients and that the accumulator is relatively complex. Furthermore, whenever the transfer function of the filter is to be changed, the entire contents of the memory must be modified. This implies the use of an auxiliary memory to store all of the coefficients to be used for the desired transfer functions, and of a processor to compute on a "demand" basis the new partial results to be stored in the main memory.

Accordingly, the main object of the present invention is to provide a digital filter using a memory whose contents are independent of the transfer function of the filter.

The foregoing and other objects, features and advantages of the invention will be apparent from the following more particular description of a preferred embodiment of the invention, as illustrated in the accompanying drawings.

As previously mentioned, the expression which the samples $Y_i$ of the filtered signal must satisfy is essentially the same whether a transversal or a recursive filter is used and the basic principle of the present invention applies equally well to either type of filter. For simplicity, a transversal filter will be described hereinafter. The equation associated with such a filter is:

$$Y_i = \sum_{k-1}^{n} a_k \cdot x_{i-k} \qquad (1)$$

Hence, $$2Y_i = \sum_{1}^{n} (x_{i-k} + a_k)^2 - \sum_{1}^{n} x_{i-1}^2 - \sum_{1}^{n} a_k^2 = U_i + V_i + W \qquad (4)$$

where $$U_i = \sum_{1}^{n} (x_{i-1} + a_k)^2$$

$$V_i = -\sum_{1}^{n} x_{i-k}^2$$

$$W = -\sum_{1}^{n} a_k^2$$

If $Y_i$ is to be derived from Eq. 4, a single addition will be required to obtain the term $W_i$, which is constant for a given filter. The other two terms $U_i$ and $V_i$ can be obtained in a relatively simple manner by using as basic element a memory storing the squares of the values of digitized samples, said memory being referred to hereafter as a "squares memory." All that is required to obtain $U_i$ is to perform the operation $x_k = x_{i-k} + a_k$ and to address the squares memory using the value of $x_k$, and then to add together the values thus fetched from the memory. The elements which comprise the term $V_i$ can also be obtained from the squares memory by setting $a_k = 0$. Assuming by way of example that the inputs representing the samples of the $x$ form, as well as the coefficients, comprise three significant bits, that is, three bits defining their amplitude, then all words $x$ can be defined by means of four bits. Any $x^2$ will be obtained by addressing the memory using the value $x = x + a$, as shown in Table 1.

TABLE 1

| Address x | | | | $x^2$ | | | | | | | |
|---|---|---|---|---|---|---|---|---|---|---|---|
| $2^3$ | $2^2$ | $2^1$ | $2^0$ | $2^7$ | $2^6$ | $2^5$ | $2^4$ | $2^3$ | $2^2$ | $2^1$ | $2^0$ |
| 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 1 |
| 0 | 0 | 1 | 0 | 0 | 0 | 0 | 0 | 0 | 1 | 0 | 0 |
| 0 | 0 | 1 | 1 | 0 | 0 | 0 | 0 | 1 | 0 | 0 | 1 |
| 0 | 1 | 0 | 0 | 0 | 0 | 0 | 1 | 0 | 0 | 0 | 0 |
| 0 | 1 | 0 | 1 | 0 | 0 | 0 | 1 | 1 | 0 | 0 | 1 |
| 0 | 1 | 1 | 0 | 0 | 0 | 1 | 0 | 0 | 1 | 0 | 0 |
| 0 | 1 | 1 | 1 | 0 | 0 | 1 | 1 | 0 | 0 | 0 | 1 |
| 1 | 0 | 0 | 0 | 0 | 1 | 0 | 0 | 0 | 0 | 0 | 0 |
| 1 | 0 | 0 | 1 | 0 | 1 | 0 | 1 | 0 | 0 | 0 | 1 |
| 1 | 0 | 1 | 0 | 0 | 1 | 1 | 0 | 0 | 1 | 0 | 0 |
| 1 | 0 | 1 | 1 | 0 | 1 | 1 | 1 | 1 | 0 | 0 | 1 |
| 1 | 1 | 0 | 0 | 1 | 0 | 0 | 1 | 0 | 0 | 0 | 0 |
| 1 | 1 | 0 | 1 | 1 | 0 | 1 | 0 | 1 | 0 | 0 | 1 |
| 1 | 1 | 1 | 0 | 1 | 1 | 0 | 0 | 0 | 1 | 0 | 0 |
| 1 | 1 | 1 | 1 | 1 | 1 | 1 | 0 | 0 | 0 | 0 | 1 |

Figure 1:
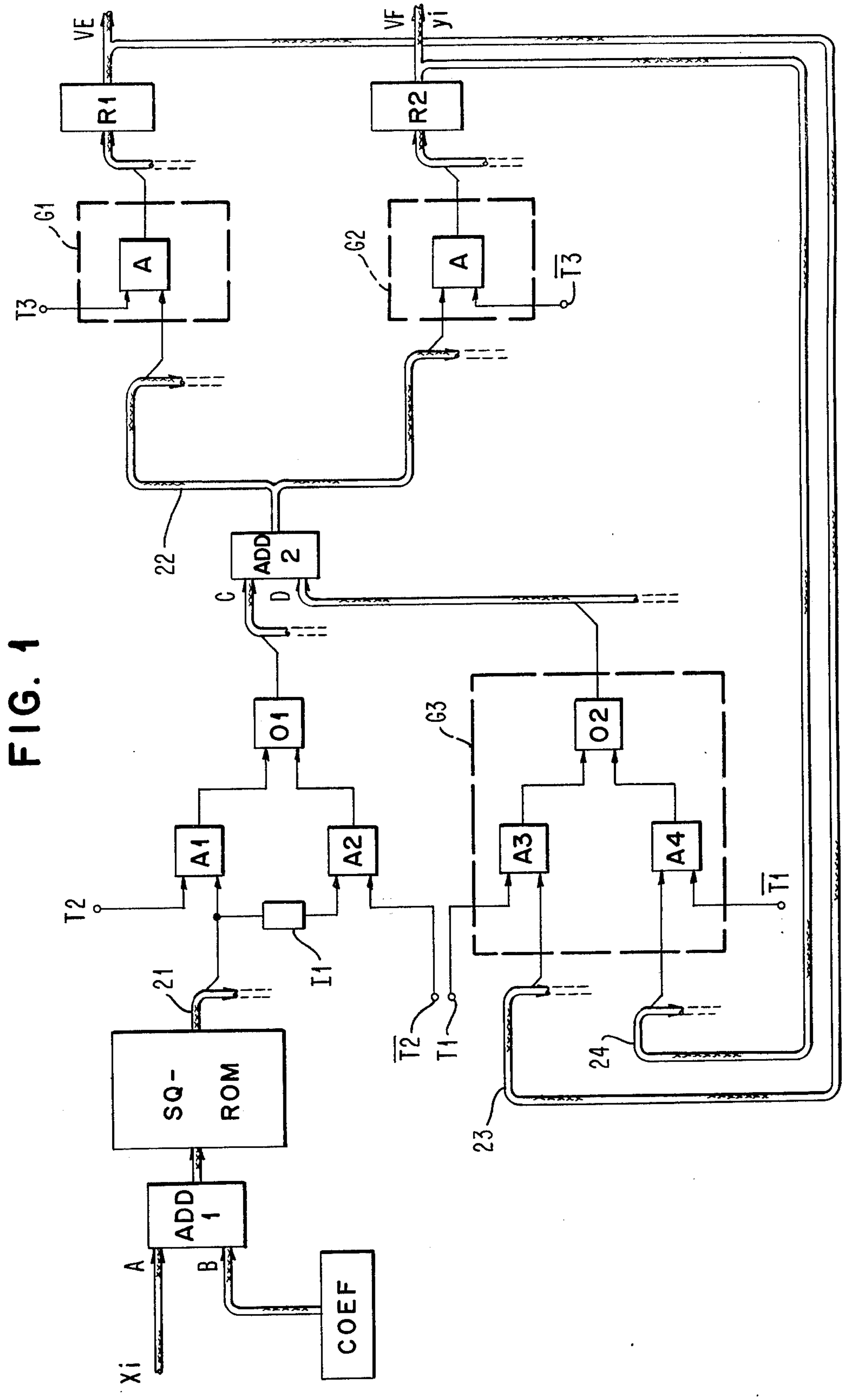
FIG. 1 is a schematic diagram illustrating a preferred embodiment of a filter realized in accordance with the present invention.

Referring now to FIG. 1, a schematic diagram of a preferred embodiment of the invention is shown. It will be assumed hereafter that the samples of the $x$ form of the signal to be filtered are coded using a sign/amplitude code such that the corresponding binary words solely consist of one bit defining the sign of the sample and of several bits defining its amplitude. The latter bits are received sequentially and fed into a device which compresses data in time. This device allows the samples to recirculate in such a way that during the time interval between two consecutive input samples $x_i$ and $x_{i-1}$, a number of samples received earlier are available at the output of the filter, as will later be described in detail. These operations may be performed, for example, by the compression device described in French Patent application No. 73 38741 filed by the same applicant on Oct. 23, 1973 and corresponding to applicant's U.S. Pat. application Ser. No. 513,797 filed on Oct. 10, 1974, which device includes a high speed shift register and associated logic circuits. It should, however, be noted that, for the purposes of the present invention, all of the bits of a given sample $x$ are provided in parallel form and are then sent to the A inputs of a parallel adder ADD 1, the B inputs of which receive the bits of related coefficient $a_k$ that are provided by a simultaneously operating memory labeled COEF. The output from ADD 1 is used to address a squares memory labeled SQ-ROM. The value fetched from the latter is fed to a gate A1 and to an inverter I1. The inverted output of I1 is passed to a gate A2 and the outputs of gates A1 and A2 are combined in an OR circuit O1. When inversion is used, the transfer path is through inverter I1. AND gate A2, which is activated by the complement of signal T2, i.e., $\overline{T2}$, and OR circuit O1. The output value provided by ADD 2 is sent either to a register R1 through a set of gates G1 when signal T3 is logically one, or to a register R2 through a set of gates G2 when T3 has a logical zero value. The outputs from R1 and R2 are sent to the input D of adder ADD 2 through a set of gates G3. Input D receives the output from R1 through AND gates A3 and OR circuits O2 when signal T1 has a logical one value, and receives the output from R2 through AND gates A4 and OR circuits O2 when T1 has a logical zero value. Additionally, the output from R2 provides the filtered signal $Y_i$ at output $V_F$ while the output from R1 provides information on the energy of the filtered signal at $V_E$. It should be noted that the circuits shown at I1, A1, A2, O1, G1, G2, and G3 are in fact reproduced on each of the conductors of the busses 21, 22, 23, and 24 along which travel the bits of the value fed thereto since all bits of a given value are processed in parallel.

Before describing the operation of the embodiment shown in FIG. 1, it may be well to point out that fewer operations than might be supposed are necessary to obtain the term $V_i$. Since $$-\sum_{1}^{n} x_{i-k}^2 = -\sum_{1}^{n} x_{(i-1)-k}^2 - x_{i-1}^2 + x_{i-n-1}^2$$

it follows that $$V_i = V_{i-1} - x_{i-1}^2 + x_{i-n-1}^2.$$

$V_i$ can, therefore, be obtained by updating the term $V_{i-1}$ that was previously computed while determining $Y_{i-1}$. This requires no more than two additional references to memory SQ-ROM.

Figure 1A:
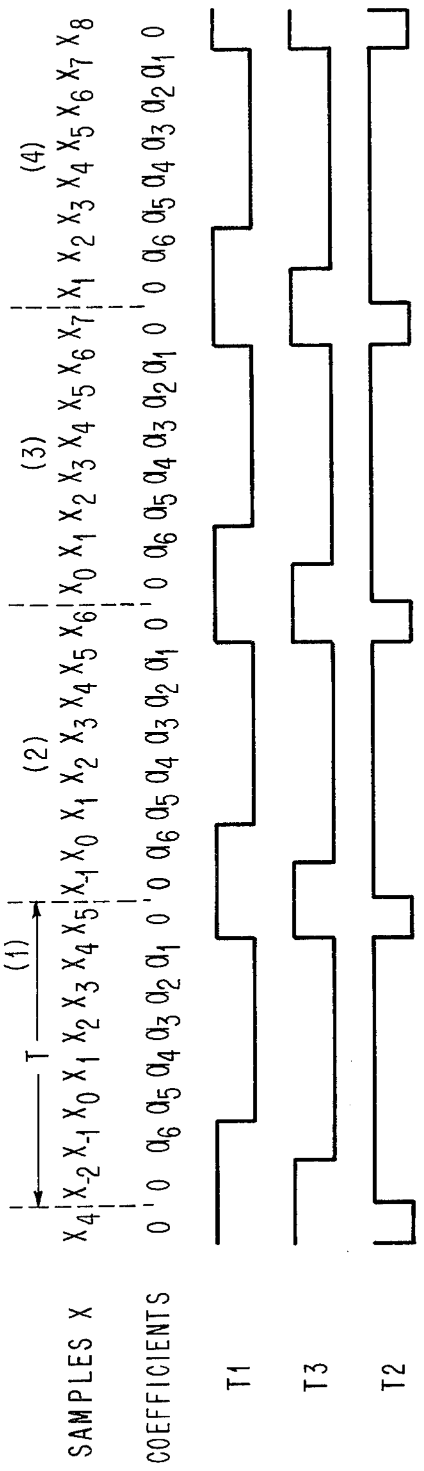
FIG. 1A shows timing curves illustrating the timing relations of the circuitry in FIG. 1.

To explain the operation of the filter, it will be assumed by way of example that the filter has six coefficients, $a_1$ to $a_6$, and that the values of the input samples $x_i$ are available in the sequence shown in FIG. 1A, at the output of the data compression device. The train of data values of the input samples $x_i$ may be thought of as consisting of sequences the duration of which is equal to the sampling period T of the signal to be filtered. During each of these sequences, the filter must compute a sample $Y_i$ that will satisfy the expression $$Y_i = \sum_{k=1}^{n} a_k \cdot x_{i-k}$$

The sample computed during the second period T shown in FIG. 1A will, therefore, be expressed as $$Y_6 = a_1x_5 + a_2x_4 + a_3x_3 + a_4x_2 + a_5x_1 + a_6x_0.$$

If this sample $Y_6$ is computed from the expression $$(a_1+x_5)^2 + (a_2+x_4)^2 + (a_3+x_3)^2 + (a_4+x_2)^2 + (a_5+x_1)^2 + (a_6+x_0)^2,$$

it will be necessary to subtract therefrom the corrective term $(W+V_6)$ expressed as $$(W+V_6) = -x_5^2 - x_4^2 - x_3^2 - x_2^2 - x_1^2 - x_0^2 - {}_1{}^n\, a_k^2$$

where $$W = \sum_{1}^{n} a_k^2 = 2_1^2 + a_2^2 + a_3^2 + a_4^2 + a_5^2 + a_6^2,$$

W having a constant value for a given filter.

The next sample (3), $Y_7$, will have the value $$Y_7 = a_1x_6 + a_2x_5 + a_3x_4 + a_4x_3 + a_5x_2 + a_6x_1$$

and consequently its corrective term $(W+V_7)$ will be $$(W+V_7) = -x_6^2 - x_5^2 - x_4^2 - x_3^2 - x_2^2 - x_1^2 - \sum_{1}^{n} a_{k.}^2 = (W+V_6) - x_6^2 + x_0^2.$$

Thus, the transition from $Y_6$ to $Y_7$ necessitates the updating of the corrective term, which is done by adding the value $x_0^2$ and subtracting the value of $x_6^2$. Each sequence of operations intended to form a sample of the filtered signal ends with such an updating of the corrective term. For example, at the end of the period preceding that during which $Y_7$ is to be formed, i.e., end of period (2), input A of adder ADD 1, FIG. 1, received $x_6$ while input B received zero. The output from ADD 1, $x = x_6$, was then used to address memory SQ-ROM which provided $x_6^2$ on bus 21. Since signal $\overline{T2}$ had at that time a logical one value (T2=0), $x_6^2$ inverted by interter I1 was sent to input C of adder ADD 2 through AND gate A2 and OR circuit O1. Because signal T1 also had a logical one value, the contents of register R1, namely, the corrective term $(W+V_6)$, were sent to input D of adder ADD 2 through AND gate A3 and OR circuit O2. Adder ADD 2 then performed the operation $(W+V_6) - x_6^2$ and fed the result to R1 due to gate G1 being activated by signal T3, thereby partially updating the corrective term. At the beginning of the next period, that is, the period (3) during which $Y_7$ is to be formed, $x_0$ is received at input A of ADD 2 and zero at input B. The output from ADD 1, $x_0$, addresses memory SQ-ROM which provides $x_0^2$. Since signal T2 has at this time a logical 1 value, $x_0^2$ is sent unchanged to input C of adder ADD 2 through A1 and O1 while input D receives the contents of R1 through G3, as described above. The corrective term $(W+V_7)$ is thus obtained and stored in register R1. The next term $x_1$, is then received at input A of ADD 1 while coefficient $a_6$ is received at input B. Memory SQ-ROM addressed by the value $(a_6+x_1)$ provides the word corresponding to $(a_6+x_1)^2$ to ADD 2 since signal T2 then has a logical one value. Because signal T1 also has a logical 1 value, input D of ADD 2 receives the contents of register R1 through G3. Adder ADD 2 then performs the operation $(W+V_7) + (x_1+a_6)^2$ the result of which is gated to register R2 through G2 under control of the $\overline{T3}$ signal. Next, $x_2$ and $a_5$ are received at the inputs of ADD 1 and memory SQ-ROM provides $(x_2+a_5)^2$. This word is fed to register R2 the contents of which then become $(W+V_7) + (x_1+a_6)^2 + (x_2+a_5)^2$. Thereafter, the above operations are repeated until R2 contains:

$$(W+V_7) + (x_1+a_6)^2 + (a_2+a_5)^2 + (a_3+a_4)^2 + (x_4+a_3)^2 + (x_5+a_2)^2 + (x_6+a_1)^2 = Y_7.$$

$Y_7$ is then passed on through a gate (not shown in FIG. 1) located at output VF.

The term $x_7$ is then received at input A of adder ADD 1. The corrective term for $Y_8$ is partially updated as described above and a new cycle is initiated.

Most of the components of the device of the present invention are of a conventional nature and will not be described in detail. Suffice it to say here that parallel adders ADD 1 and ADD 2 may be of the general type described, for example, in the book entitled, "Arithmetic Operations in Digital Computers," by R. K. Richards, and more particularly of the type illustrated in FIG. 4–1, page 84, providing that the negative words are complemented, or in FIG. 4–28, page 123, of said book. The structure of the memories may be of any conventional type, but in order to minimize their cost, it is necessary to reduce their size as much as possible. This may be done by using the methods of operation described hereafter. Because the size of a memory capable of storing all of the words required is a direct function of the number of bits comprised in the address, the elimination of a single one of these bits will result in the memory size required being reduced by half. Since a sign/amplitude binary code has been selected in this example and the word provided by memory SQ-ROM is independent of the sign, the latter need not be included in the address. In addition, if we call X the memory address and X(0), X(1), X(2), . . . the various 0 or 1 bits which define its amplitude, we may write:

$$X = 2^0.X(0) + 2^1.X(1) + 2^2.X(2) + 2^3.X(3) + \ldots 2^m.X(m).$$

Figure 2A:
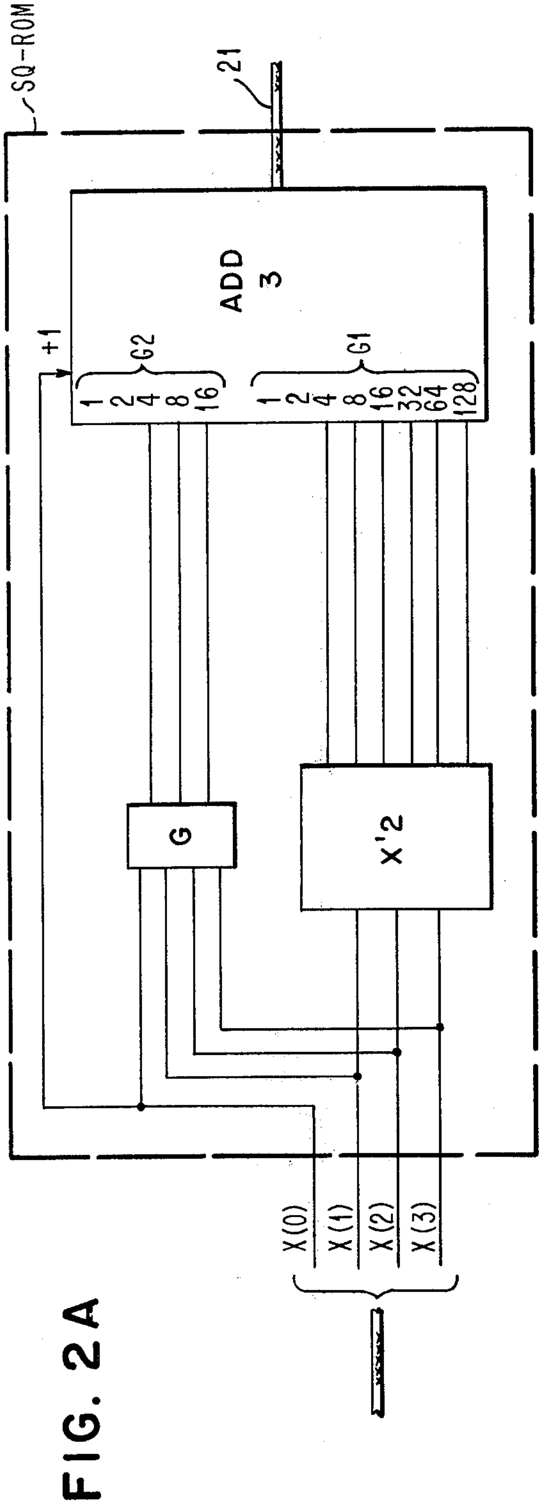
FIGS. 2A and 2B are schematic diagrams illustrating data storage devices that can be used in the filter of the present invention.

X may also be written X=X(0)+X', where X'−2 $X(1)$ + 4 X (2) + . . . The lowest order bit of X' being always zero, the effect will be the same as if X' had a length 1 bit less than X. Also, if X(0) = 0, its contribution to X is nil and $X^2 = X'^2$; however, if X(0) = 1, $X^2$ can be obtained from the expression $X^2 = 1+2.X'+X'^2$. Accordingly, the memory storing the values $X^2$ can be replaced by a memory storing the values $X'^2$. It will be observed that X' is always even, so that its lowest order bit is zero. This bit is therefore unnecessary in the memory address. In other words, the address of the memory storing the values $X'^2$ (referred to hereafter as memory $x'^2$) comprises one bit less than that of the memory storing the values $X^2$. This permits reducing the memory size by half, but a scheme such as that shown in FIG. 2A must then be used to obtain $X^2$. In this scheme, bit X(0) controls a gate G. When X (0) = 0, gate G is deactivated and the addressed memory $X'^2$ feeds a group of inputs, G1, of parallel adder ADD 3 which provides $X^2$. It should be noted that memory $X'^2$ does not supply the two lowest order bits (having weights 1 and 2), both of which are always equal to zero. When X(0) = 1, gate G is activated and the second group of inputs, G2, of ADD 3 receives the value 2X', which is obtained from X' by shifting the bits one position to the next higher order. To obtain $X^2$, it is further necessary to force a binary 1 into the carry input of that stage of ADD 3 which processes the lowest order bit. Thus, the operation $X^2 = X'^2 + 2X' + 1$ is performed.

For example, if the value X = 1110 (so that $X^2 = 196$ in decimal notation) so that X(0) = 0, gate G remains closed and the output therefrom is an all-zero value. Memory $X'^2$ is addressed by means of the value 111 and provides the value 110001, to which is appended the two lowest order bits which, as previously mentioned, are always 0. Thus, the value $X^2 = 11000100$, or 196 in decimal notation, is obtained on bus 21.

To take another example, if X = 1111, or 15 in decimal notation, X(0) = 1, gate G is activated and the group of inputs G2 receives 11100 while memory $X'^2$, which is addressed by means of the value 111, provides the term 110001 as in the previous example. Since two low order zeros are appended thereto, as explained above, the group of inputs G1 receives the value 11000100. This is added to the term 11100 from G in ADD 3, which yields 111000000. Since a binary 1 is forced into the carry input of that stage of ADD 3 which processes the lowest order bit, there is finally obtained $X^2$ = 11100000+1 = 11100001 or 225 in decimal notation.

Thus, regardless of whether X = 1110 or 1111, the same memory position of $X'^2$ is addressed, thereby allowing the memory size to be reduced by half.

From the foregoing, it will be seen that the reduction in the memory size is achieved by reducing the number of words to be stored therein. The memory size could be reduced still further by reducing the number of bits comprising each stored value, without affecting the accuracy of the results obtained. Since bit X(0) is used as a gate control and is not utilized as a part of the address of memory $X'^2$, we may write $$X' = 0.X(0) + 2^1X(1) + 2^2X(2) + 2^3X(3) + \ldots + 2^nX(n).$$

where X comprises $n$+1 bits.

Hence $$(X'/2)^2 = [2^0 X(1) + 2^1 X(2) + 2^2 X(3) + \ldots + 2^{n-1} X(n)]^2$$

so that $$X'^2/4 = 2^0X(1) + 2^1 X(0) + 2^1 \overline{X}(1) X(2) + \ldots$$
$$X'^2 = 2^2.X(1) + 2^3 . 0 + 2^4\overline{X}(1) . X(2) + \ldots$$

Figure 2B:
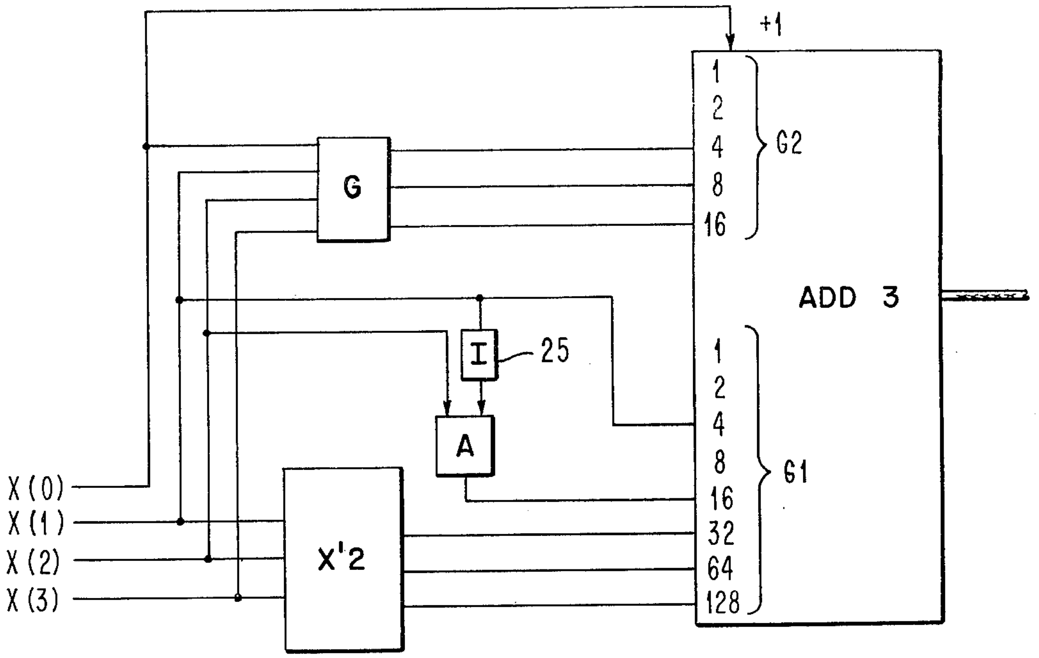

The latter expression shows that the bits with weights 1, 2, 4, 8 and 16 in $X'^2$ can readily be obtained by means of simple logical operations. Accordingly, these bits need not be included in the words stored in memory $X'^2$. This memory can then be implemented in accordance with the scheme illustrated in FIG. 2B. The bits having weights 1, 2 and 8 are always zero and may be ignored, i.e., the inputs of group G1 which process these bits receive no signals. The value of the bit with weight 4 is identical with X(1) and that of the bit with weight 16 can be obtained by performing the logical AND operation $\overline{X}$(1).X(2). The fact that these five bits need no longer be stored in memory $X'^2$ results in a substantial saving in storage space. This explains the use in the diagram of FIG. 2B of an inverter 25 which inverts bit X(1) and an AND circuit A. The diagram of FIG. 2B illustrates the methods of operation discussed above.

From the foregoing, it will be apparent that the main advantage of the preferred embodiment of the invention is to minimize the cost of the memories required. However, this in no way limits the invention to the type of filter described hereinabove. Should future technological developments make it possible to reduce the cost of the memories, other embodiments of the invention might be deemed preferable. For example, it might be desirable to use a slightly more complex squares memory in order to eliminate the circuit that serves to update the corrective term since, from the expression $$Y_i = \sum_1^n a_k \cdot x_{i-k},$$

we may also derive $$-2Y_i = \sum_1^n (x_{i-k}-a_k)^2 - \sum_1^n a_k^2 \quad (5)$$

Combining expressions (4) and (5), we get $$4Y_i = \sum_1^n (x_{i-k}+x_k)^2 - \sum_1^n (x_{i-k}-a_k)^2 = U_i - U_i' \quad (6)$$
$$= \sum_1^n [(x_{i-k}+a_k) - (x_{i-k}-a_k)^2$$

Figure 3:
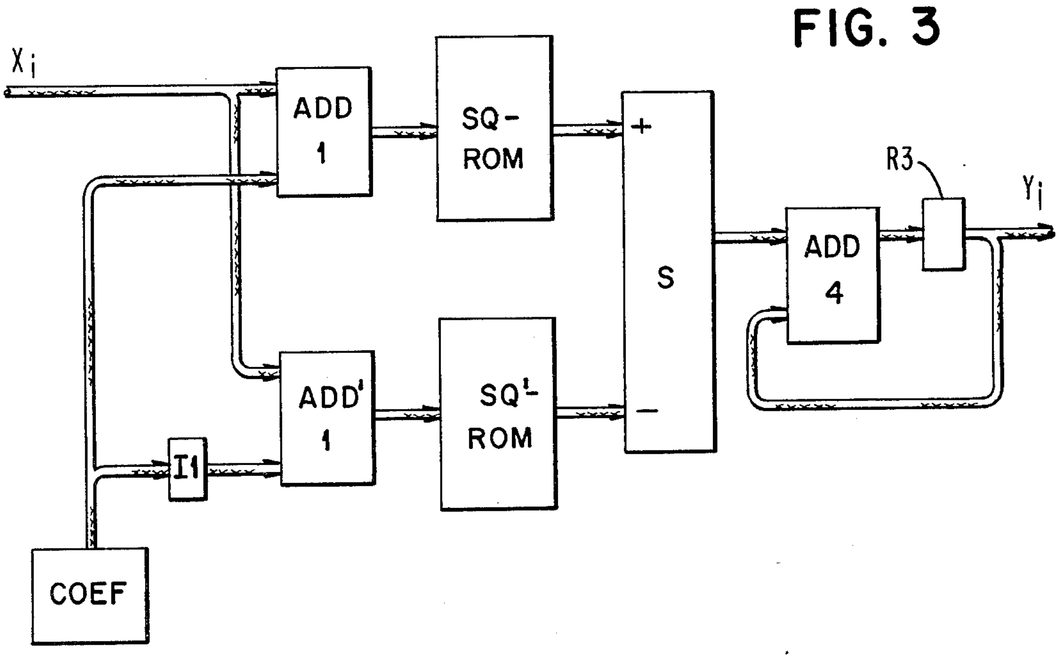
FIG. 3 is a schematic diagram of another embodiment of the filter of the present invention.

A schematic diagram of a device capable of performing the operations represented by expression 6 is shown in FIG. 3. The values of the samples of $x$ are simultaneously sent on bus $X_i$ to one input of each of the identical parallel adders ADD 1 and ADD' 1. Similarly, the coefficients for those samples are sent to both of the other inputs of these adders, those intended for ADD' 1 being first inverted by an inverter I1. The output term from ADD 1 is used to address the same memory SQ-ROM as has been described above. The output term from ADD' 1 is used to address a second memory SQ'-ROM which is identical with SQ-ROM. Since adders ADD 1 and ADD' 1 are identical, it would be possible by the use of buffer registers to eliminate either of them and to cause the remaining one to alternatively perform its own functions and those of the eliminated adder by using a multiplexing technique. Similarly, either one of identical memories SQ-ROM and SQ'-ROM could be eliminated. The two words fetched from the memories SQ-ROM and SQ'-ROM should be subtracted from each other in a subtractor stage S, with the data provided by S being accumulated n times. This accumulation would be performed as previously, using a parallel adder (ADD 4) and a register R3.

The input data compression circuit for the device of FIG. 3 is slightly different from that previously described since the coefficients do not occur in the same sequence as before due to the elimination of the coefficients zero that were necessary to process the corrective term. The new sequence is simply $a_6\ a_5\ a_4\ a_3\ a_2\ a_1$.

Concerning the values of the samples $x_i$ of the $x$ form, the sequence is modified by substituting at each sample time the value $x$ currently received from the input line for that received six sample times earlier, thus:

$$x_0\ x_1\ x_2\ x_3\ x_4\ x_5,\ x_1\ x_2\ x_3\ x_4\ x_5\ x_6,\ x_2\ x_3\ x_4\ x_5\ x_6\ x_7 \text{ etc.}$$

The compression device which can perform this function is similar to that previously mentioned, except that the capacity of the compression register and the clock rate that controls the circulation of the words within this register are modified to reflect the new sequence of the samples $x_i$.

While the invention has been particularly shown and described with reference to a particular embodiment thereof, it will be understood by those skilled in the art that the foregoing and other changes in form and detail may be made therein without departing from the spirit and scope of the invention.

What is claimed is:

1. A digital filter for generating processed output samples of a signal Y from input terms representing sequential values of samples of an input signal X, said filter comprising:

a. means for algebraically and cyclically adding sequences of predefined coefficients to the sequence of terms representing the latest values of samples of the data to be filtered;

b. a memory storing the squares of the values of all possible sums resulting from the operations performed by said adding means;

c. addressing means for said memory to receive one of said sums from said adding means and to control readout from said memory of the corresponding square value; and d. means for accumulating said square values fetched from said memory during each of said sequences to provide a corresponding sample of a filtered output signal Y.

2. A digital filter of the type wherein a sample $Y_i$ of a desired filtered output signal at instant $i$ is generated by the accumulation of the products of the values of samples $x_{i-k}$ of an input signal $x$ and corresponding coefficients $a_k$, said filter characterized in that it includes:

a. a first means for generating the term $U_i$ defined by the expression $$U_i = \sum_{k=1}^{n} (x_{i-k} + a_k)^2,$$

said first means including:

i. sum means for providing an address value obtained by adding a first coefficient value $a_1$ to the value of a sample $x_{i-1}$;

ii. a memory storing the values of the squares of all possible address values;

iii. means for addressing said memory, using said address value from said sum means, and for fetching from said memory the value corresponding to $(x_{i-1} + a_1)^2$, iv. an accumulator to receive said fetched value; and v. means for repeatedly operating said sum means and said addressing and readout means with the value of $k$ increased by increments of 1 until $k=n$ and accumulating said values fetched from said memory;

b. a control means including a second accumulator for also addressing said memory to provide and accumulate the squares of the values of said input samples and a correction factor to generate a corrective term $V_i + W$ expressed as $$V_i + W = -[\sum_{1}^{n} x_{i-k}^2 + \sum_{1}^{n} a_k^2]$$

c. and another summing means for adding said corrective term to the result of the operation performed by said first means.

3. A digital filter of the type wherein the value of a sample $Y_i$ of the desired filtered output signal at instant $i$ is obtained by accumulating the values of samples of an input signal $x$ weighted by corresponding coefficient values, characterized in that said filter includes:

a. a storage device to provide sequences of coefficient values;

b. a first means for forming addresses by adding the filter coefficients to corresponding samples of the signal $x$ to be filtered;

c. a memory having at each storage address, a value representing the square of the memory address;

d. a second means for addressing said memory storing the squares of the addresses, using the address values provided by said first means;

e. a register means for accumulating the values thus fetched from said memory;

f. a third means for forming a second set of storage addresses by subtracting the filter coefficients from corresponding ones of said consecutive samples of the signal $x$ to be filtered;

g. a second squares memory;

h. a fourth means for addressing said second squares memory, using the values supplied by said third means;

i. a fifth means for subtracting the values read out from said second squares memory as a result of the addressing performed by said fourth means from the accumulation performed by said second means.

* * * * *